(12) United States Patent
Karafillis

(10) Patent No.: US 7,334,997 B2
(45) Date of Patent: Feb. 26, 2008

(54) HYBRID BLISK

(75) Inventor: Apostolos Karafillis, Arlington, MA (US)

(73) Assignee: General Electric Company, Schenectady, NY (US)

(*) Notice: Subject to any disclaimer, the term of this patent is extended or adjusted under 35 U.S.C. 154(b) by 205 days.

(21) Appl. No.: 11/162,624

(22) Filed: Sep. 16, 2005

(65) Prior Publication Data

US 2007/0065291 A1    Mar. 22, 2007

(51) Int. Cl.
    *F01D 5/14* (2006.01)
(52) U.S. Cl. .............. 416/224; 416/229 A; 416/223 A
(58) Field of Classification Search .......... 416/224, 416/223 A, 234, 229 A, 235
    See application file for complete search history.

(56) References Cited

U.S. PATENT DOCUMENTS

| | | | |
|---|---|---|---|
| 5,634,771 A | * | 6/1997 | Howard et al. ......... 416/241 A |
| 5,655,883 A | | 8/1997 | Schilling |
| 5,791,879 A | | 8/1998 | Fitzgerald et al. |
| 6,033,186 A | * | 3/2000 | Schilling et al. ............ 416/233 |
| 6,139,278 A | * | 10/2000 | Mowbray et al. ........ 416/229 A |
| 6,287,080 B1 | | 9/2001 | Evans et al. |
| 6,454,536 B1 | | 9/2002 | Evans et al. |
| 6,471,485 B1 | * | 10/2002 | Rossmann et al. .......... 416/234 |
| 2002/0127108 A1 | * | 9/2002 | Crall et al. ................ 416/234 |

* cited by examiner

*Primary Examiner*—Richard A. Edgar
(74) *Attorney, Agent, or Firm*—Adams Evans P.A.; David L. Narciso

(57) ABSTRACT

A rotor assembly or "blisk" for a gas turbine engine includes a metallic hub having an annular flowpath surface, and at least one blade extending outwardly from the flowpath surface. The blade includes a metallic body having a first density. The metallic body defines a shank portion and an airfoil portion having opposed pressure and suction sides, and is integral with the hub. An insert having a second density less than the first density is carried by the body, and the insert and the body collectively define an airfoil shape. A method is also provided for manufacturing a rotor assembly.

17 Claims, 8 Drawing Sheets

HYBRID BLISK

BACKGROUND OF THE INVENTION

The present invention relates generally to gas turbines, and more particularly to a hybrid blisk for a gas turbine.

Gas turbines include, among other variations, gas turbine power generation equipment and gas turbine aircraft engines. A gas turbine includes a core engine having a high pressure compressor, a combustor in which a mixture of fuel and compressed air is burned to generate a propulsive gas flow, and a high pressure turbine which is rotated by the propulsive gas flow and which is connected by shaft to drive the high pressure compressor. A typical gas turbine aircraft engine adds a low pressure turbine which is connected by another shaft to drive a fan rotor. The fan rotor is one of the heaviest components of this type of engine.

The fan rotor carries a plurality of airfoil-shaped blades, usually installed in an array of dovetail slots. Conventional gas turbine blade designs typically are made entirely of metal, or of a composite material such as carbon-epoxy composite. All-metal blades, including costly wide-chord hollow blades, are relatively heavier in weight which results in lower fuel performance and which requires sturdier blade attachments, while the relatively lighter all-composite blades are more susceptible to damage from bird strikes. Known hybrid blades include composite blades whose leading edge is protected by metal for erosion and bird impact reasons, and metallic blades with nonmetallic inserts. While these hybrid blades reduce the weight of the fan rotor, they still require a separate mechanical attachment to the rotor.

Accordingly, there is a need for a fan rotor which is both light-weight and impact resistant.

BRIEF SUMMARY OF THE INVENTION

The above-mentioned need is met by the present invention, which according to one aspect provides a rotor assembly for a gas turbine engine, including: a metallic hub having an annular flowpath surface; and at least one blade extending outwardly from the flowpath surface. The blade includes a metallic body having a first density, the metallic body defining a shank portion and an airfoil portion having opposed pressure and suction sides, and being integral with the hub; and an insert having a second density less than the first density carried by the body. The insert and the body collectively define an airfoil shape.

According to another aspect of the invention, a method of making rotor assembly for a gas turbine engine includes forming a metallic hub having an annular flowpath surface; and forming at least one blade integral to the hub and extending outwardly from the flowpath surface. The blade includes a metallic body having a first density, the metallic body defining a shank portion and an airfoil portion having opposed pressure and suction sides, and being integral with the hub; and an insert having a second density less than the first density carried by the body, wherein the insert and the body collectively define an airfoil shape.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
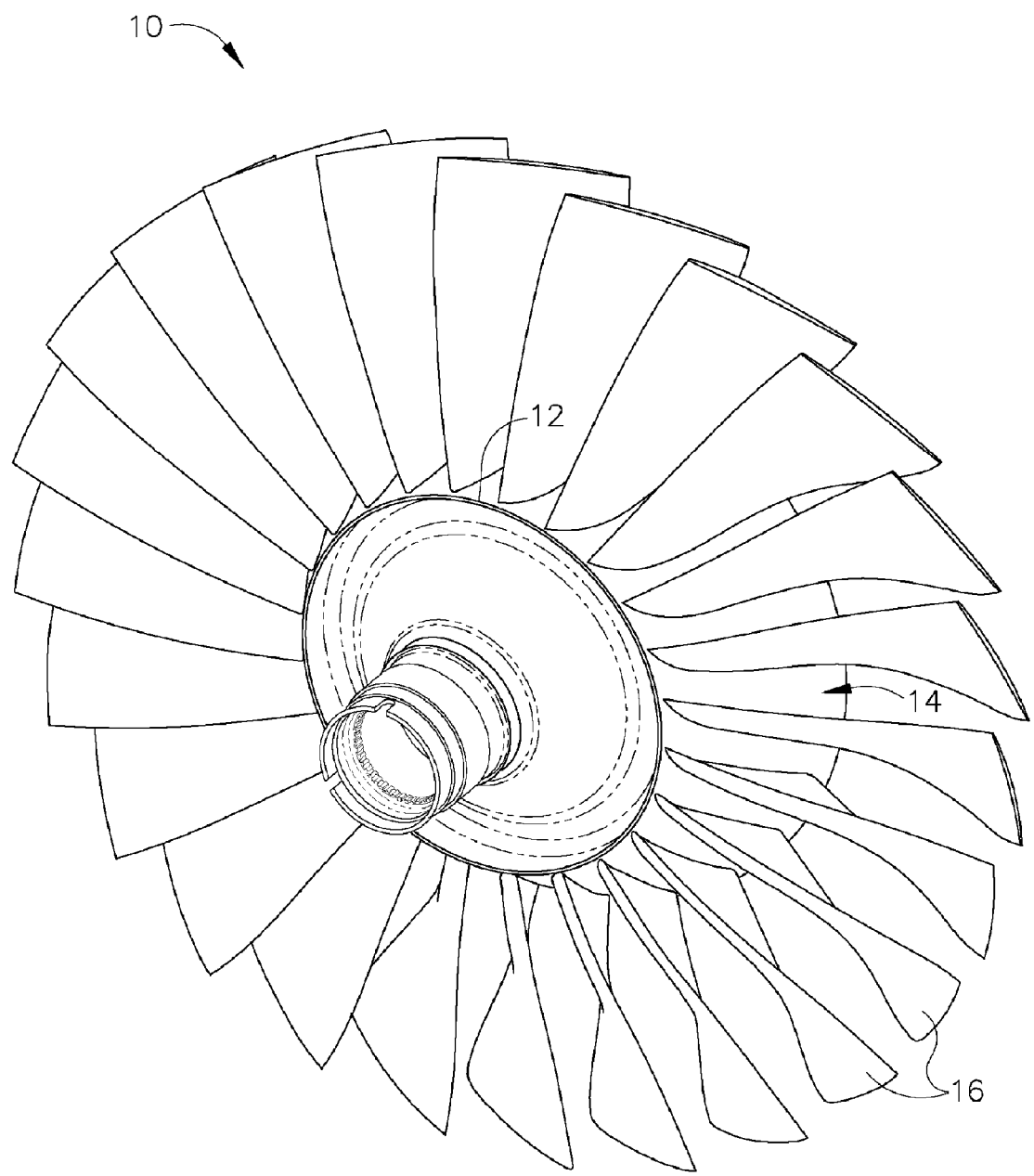
FIG. 1 is a perspective view of a fan blisk constructed in accordance with the present invention.

Referring to the drawings wherein identical reference numerals denote the same elements throughout the various views, FIG. 1 depicts an exemplary fan blisk 10 constructed in accordance with the present invention, having a metallic hub 12 with an annular flowpath surface 14, and a plurality of airfoil-shaped blades 16 attached thereto. As used herein, the term "blisk" is used to refer to any gas turbine engine component which includes a hub having blades integral therewith. Such components are sometimes referred to as "bladed disks" or "integrally bladed rotors". The present invention is especially useful for blisks used as low-pressure fans on aircraft gas turbine engines, but is applicable to any kind of blisk structure. As used herein, the term "integral" refers to two components which effectively form a single member without a mechanical discontinuity therebetween, whether the components originated separately or from a single workpiece.

Figure 2:
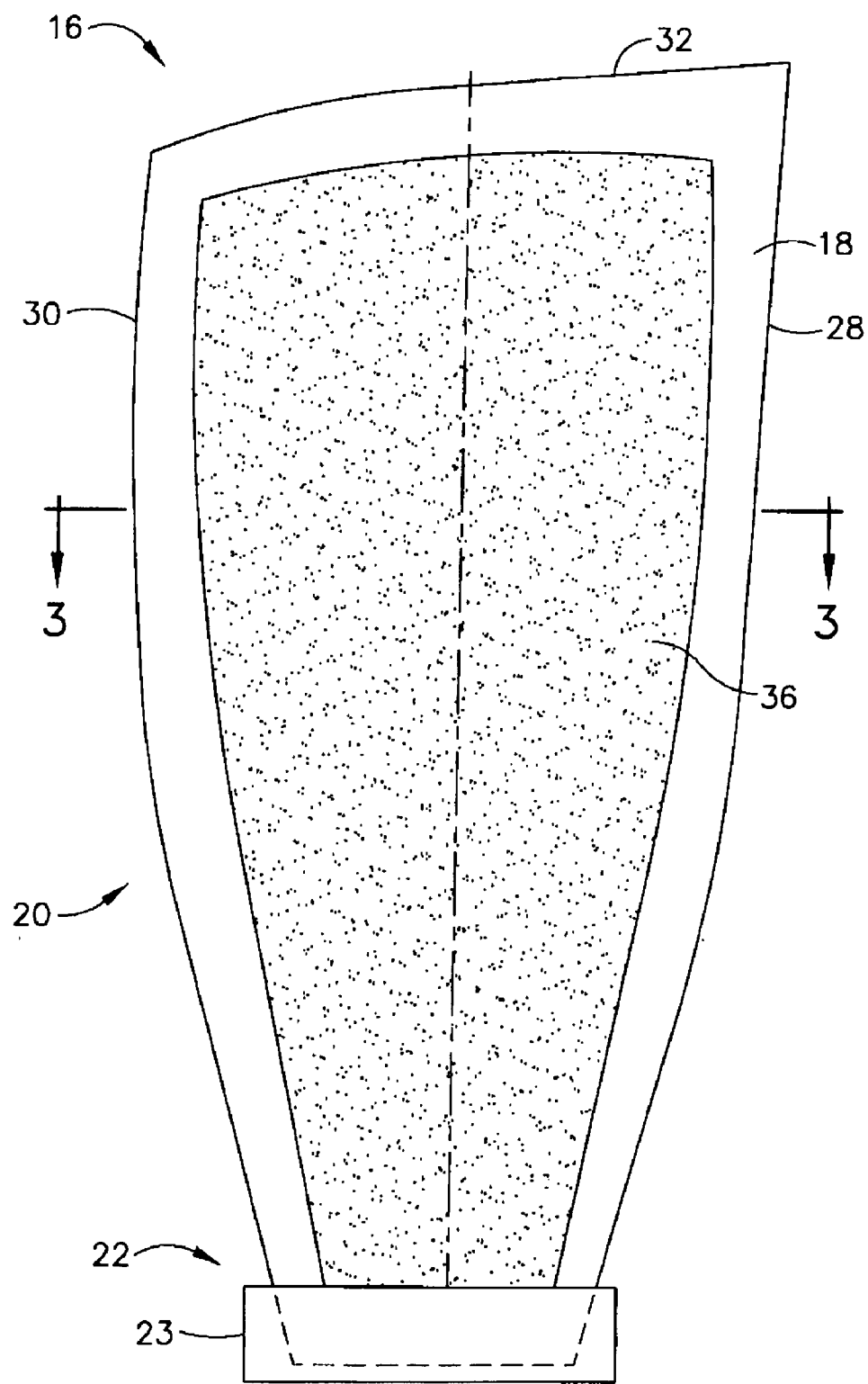
FIG. 2 is a side view of one of the fan blades of the blisk of FIG. 1.
Figure 3:
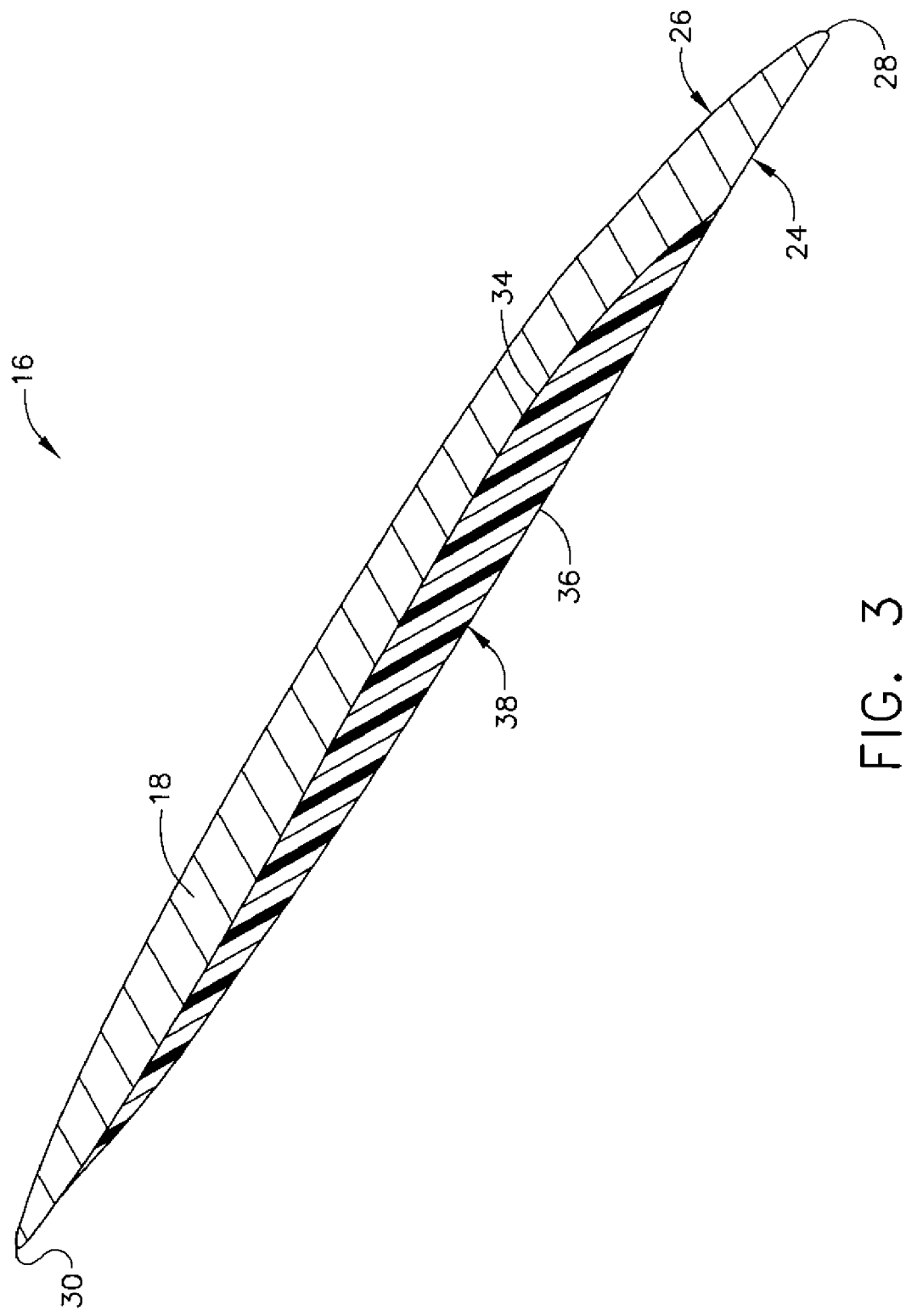
FIG. 3 is a view taken along lines 3-3 of FIG. 2.

FIGS. 2 and 3 illustrate an exemplary blade 16 in more detail. The blade 16 includes a metallic body 18 which defines an airfoil portion 20 and a shank portion 22. The airfoil portion 20 includes opposed pressure and suction sides 24 and 26, a leading edge 28, a trailing edge 30, and a tip 32.

The body 18 is constructed from a metal alloy that can be formed to the desired shape, that will withstand the necessary operating loads, and which is compatible with the hub material. Examples of suitable alloys include, but are not limited to, titanium, aluminum, cobalt, nickel, or steel-based alloys. In the illustrated example the body 18 is formed from a Ti-6Al-4V alloy. The body 18 and the hub 12 (see FIG. 1) may be formed by machining their respective contours from a single blank of material in a known manner. At least one pocket 34 is formed in the body 18. The number and location of the pockets 34 may be varied to suit a particular application. In the illustrated example, the body 18 includes single large pocket 34 formed in the pressure side 24 of the airfoil portion 20. The dimensions and shape of the pocket 34 may be selected in a known manner to affect the properties of the blade such as its torsional rigidity and frequency response.

An insert 36 is disposed in the pocket 34 and bonded thereto. The insert 36 has an outer surface 38 which forms a portion of the pressure side 24 of the blade 16. The insert 36 may be made of any material which will withstand the expected air loads and temperatures during operation and which can be formed to the desired profile. The insert 36 may or may not contribute to the overall structural integrity of the blade 16.

The insert material is less dense than the metallic body 18, so as to reduce the overall mass of the blade 16 compared to a solid airfoil. Examples of suitable materials include composites such as carbon fiber filaments embedded in an epoxy resin binder, referred to as a "carbon-epoxy" system, fiber-bismaleimide, fiber-polyimide, and other fiber-epoxy thermoset or thermoplastic resins and mixtures thereof. Other suitable materials include elastomers, rigid foams (e.g. a polymer, ceramic, silicone, or metal, or a mixture thereof having cellular structures dispersed throughout the material, structural foams (i.e. a plastic having a cellular core and integral skin), and syntactic foams (i.e. a cellular polymer made by dispersing rigid, microscopic particles in a fluid polymer and then curing it). The insert 36 may be formed and then secured in the pocket 34 with an adhesive or fasteners, or it may be formed and cured in place in the pocket 34, so as to bond directly thereto.

Figure 4:
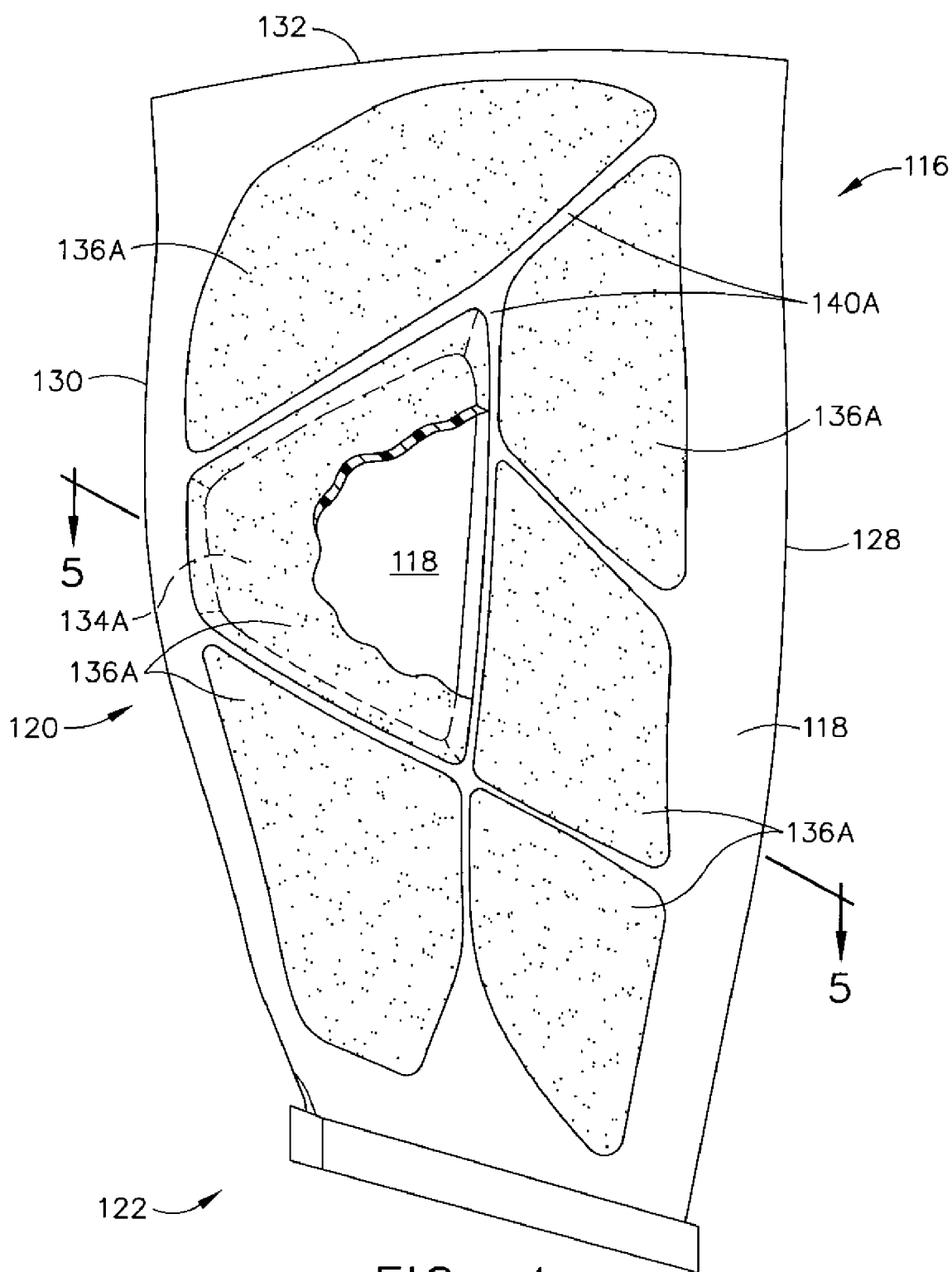
FIG. 4 is a side view of an alternative fan blade for use with the blisk of FIG. 1.
Figure 5:
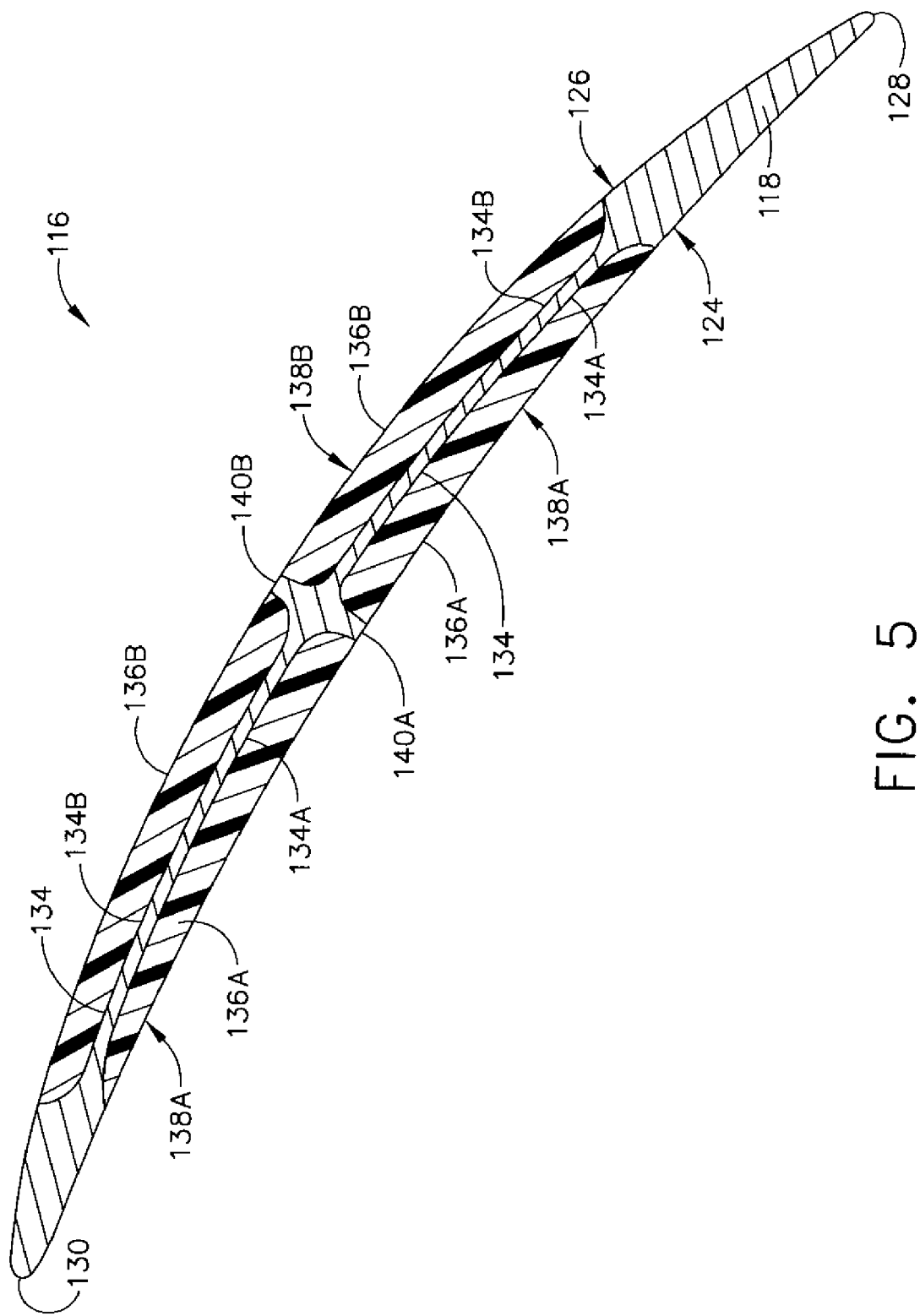
FIG. 5 is a cross-sectional view taken along lines 5-5 of FIG. 4.

FIGS. 4 and 5 illustrate an alternative blade 116. The blade 116 is substantially similar in external form to the blade 16 described above and includes a metallic body 118 defining a shank portion 122 and an airfoil portion 120. The airfoil portion 120 includes opposed pressure and suction sides 124 and 126, a leading edge 128, a trailing edge 130, and a tip 132.

The body 118 is constructed from a metallic material as noted above. The body 118 and the hub 12 (see FIG. 1) may be formed by machining their respective contours from a single blank of material in a known manner. The blade 116 differs from the blade 16 primarily in the arrangement of the pockets. At least one pocket 134 is formed in the body 118. In the illustrated example, the body 118 includes a plurality of first pockets 134A formed in the pressure side 124 of the airfoil portion 120, and a plurality of second pockets 134B formed in the suction side 126 of the airfoil portion 120. The first pockets 134A are separated by a plurality of upstanding pressure side ribs 140A, and the second pockets 134B are separated by a plurality of suction side ribs 140B. The dimensions, cross-sectional area, and pattern of the ribs 140A and 140B may be selected in a known manner to affect the properties of the blade such as its torsional rigidity and frequency response.

A first insert 136A is disposed in each of the first pockets 134A and bonded thereto. A second insert 136B is disposed in each of the second pockets 134B and bonded thereto. Each of the first inserts 136A has a outer surface 138A which forms a portion of the pressure side 124 of the airfoil portion 120, and each of the second inserts 136B has a outer surface 138B which forms a portion of the suction side 126 of the airfoil portion 120. The inserts 136 may be made of any material which will handle the expected air loads during operation and which can be formed to the desired profile. The inserts 136 may or may not contribute to the overall structural integrity of the blade 116. The insert material is less dense than the body 118, so as to reduce the overall mass of the blade 118 compared to a solid airfoil. Examples of suitable materials for the inserts 136 are noted above with respect to the inserts 36. As shown in FIG. 5, the ribs 140 extend all the way to the outer surface of the airfoil portion 120 so as to completely separate the inserts 136. Alternatively, the thickness of the ribs 140, measured in a circumferential direction, could be made less than the depth of the pockets 134, so that a continuous single insert 136 could be used to fill all of the pockets 134 on the same side of the airfoil portion 120.

Figure 6:
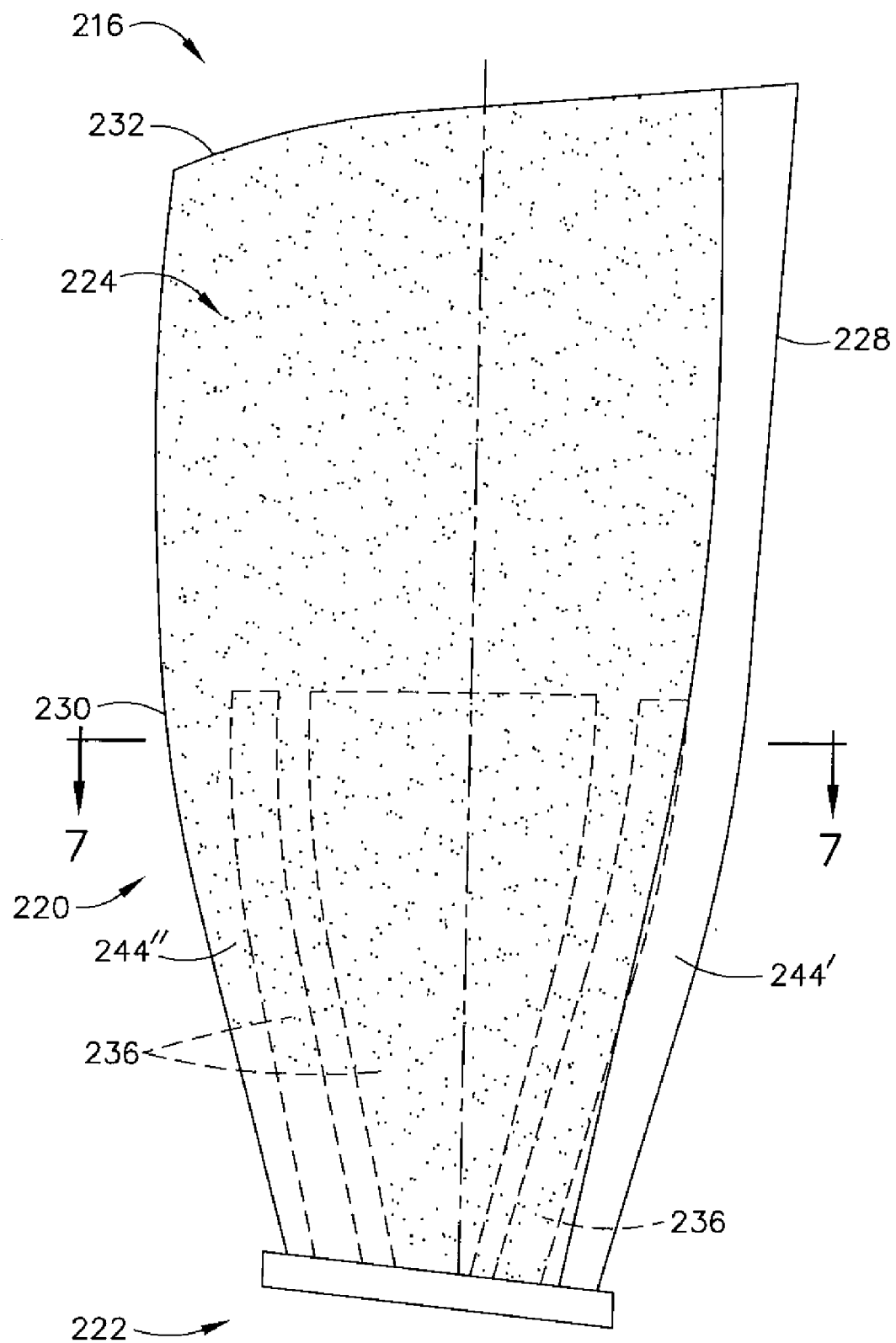
FIG. 6 is a side view of another alternative fan blade for use with the blisk of FIG. 1.
Figure 7:
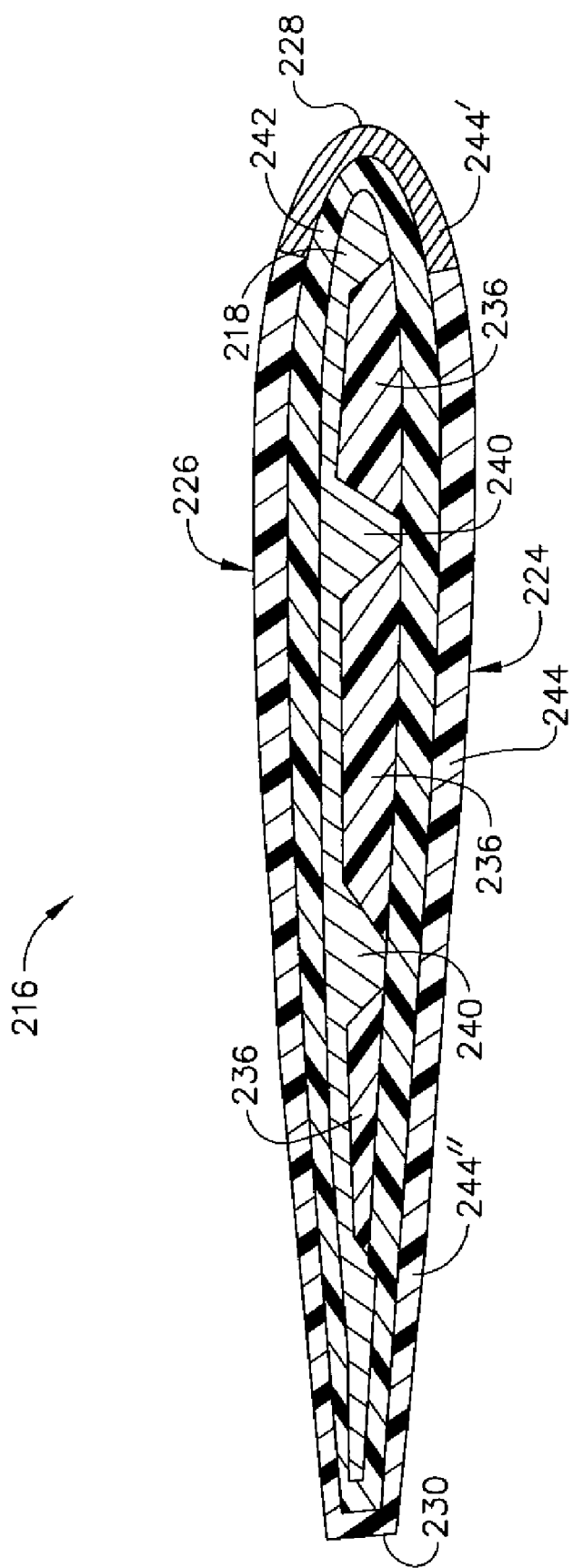
FIG. 7 is a cross-sectional view taken along lines 7-7 of FIG. 6.

FIGS. 6 and 7 illustrate another alternative blade 216. The blade 216 is substantially similar in external form to the blade 16 described above and includes a shank portion 222 and an airfoil portion 220. The airfoil portion 222 includes opposed pressure and suction sides 224 and 226, a leading edge 228, a trailing edge 230, and a tip 232.

The airfoil portion 222 includes a metallic body 218. Examples of suitable metal alloys for the metallic body 218 include, but are not limited to, titanium, aluminum, cobalt, nickel, or steel-based alloys. In the illustrated example the body 218 is formed from a Ti-6Al-4V alloy. The body 218 has a first mass density and radially extends from the shank portion to the blade tip 232.

The airfoil portion 222 includes at least one insert 236 which has a second mass density less than that of the body 218 and is bonded to the body 218 The body 218 also includes ribs 240 disposed between, and bonded to, the inserts 236. The body 218 and the inserts 236 collectively define an airfoil shape.

As noted above, the inserts 236 may be made of any material which will handle the expected air loads during operation and which can be formed to the desired profile. Examples of suitable materials are noted above. The inserts 236 may be formed and then secured to the body 218 with an adhesive or fasteners, or it may be formed and cured in place.

The airfoil portion 222 may optionally be provided with a skin 242 which covers and is bonded to the inserts 236. Such skin 242 may be of composite or metal construction. The skin 242 may be a layup of discrete composite plies or of a braided construction. In the illustrated example, the skin 242 comprises carbon, glass, or aramid filaments embedded in an epoxy resin matrix binder. Preferably the bonding of any skin composite is accomplished by use of a separate adhesive film material or resin transfer molding or injection. Other examples of bonding include, without limitation, adhesion between the composite resin itself and the substrate. Typically, the skin 242 is a thin layer and may (as shown in FIG. 7) or may not also cover the body 218. When present, the purpose of the skin 242 is to give a hard face to the insert to spread out the force of any impact.

The airfoil portion 222 may optionally include an erosion coating 244 which generally covers and is bonded to the skin 242. In an exemplary construction, the erosion coating 244 includes a metallic region 244' disposed only at generally the leading edge 228. The erosion coating 244 also includes a non-metallic region 244" disposed from the metallic region 244' to generally the trailing edge 230. An example of a material for the non-metallic region 244" is polyurethane, and an example of a material for the metallic region 244' is titanium.

The blades 16, 116, or 216 may be integrally formed with the hub 12 as noted above, or they may be separately constructed and then permanently attached to the hub 12. If the blades 16, 116, or 216 are integral with the hub 12, then the metallic bodies 18, 118, or 218 would be formed in the desired shape including any pockets, and then the inserts 36, 136, or 236 would be attached or formed therein. If the blades 16, 116, or 216 are made separately, then the inserts 36, 136, or 236 would be applied before joining the blades 16, 116, or 216 to the hub 12. Known methods of joining the blades 16, 116, or 216 to the hub 12 include translational friction welding, diffusion bonding, and fusion welding. The shank portion 22, 122, or 222 respectively of each blade 18, 118, or 218 is formed in an appropriate shape and size to accommodate the anticipated type of bonding. For example, as shown in FIG. 2, the shank portion 20 of the blade 16 includes an enlarged block portion 23, such as rectangular or parallelepiped solid shape. This allows the blade 16 to be clamped, manipulated, and bonded, and also functions as a heat sink to prevent the heat affected zone (HAZ) of the joining process from damaging the non-metallic portions of the blade 16. If the HAZ from the selected joining process (e.g. translational friction welding) can be confined to narrow enough zone so that it does not affect the engineering properties of the insert 36, then the insert 36 can be adhesively attached to the body 18 prior to bonding the body 18 to the hub 12. If the HAZ would affect the engineering properties of the insert 36, then the insert 36 may be attached to (or formed within) the body 18 after the body 18 is bonded to the hub 12.

Figure 8:
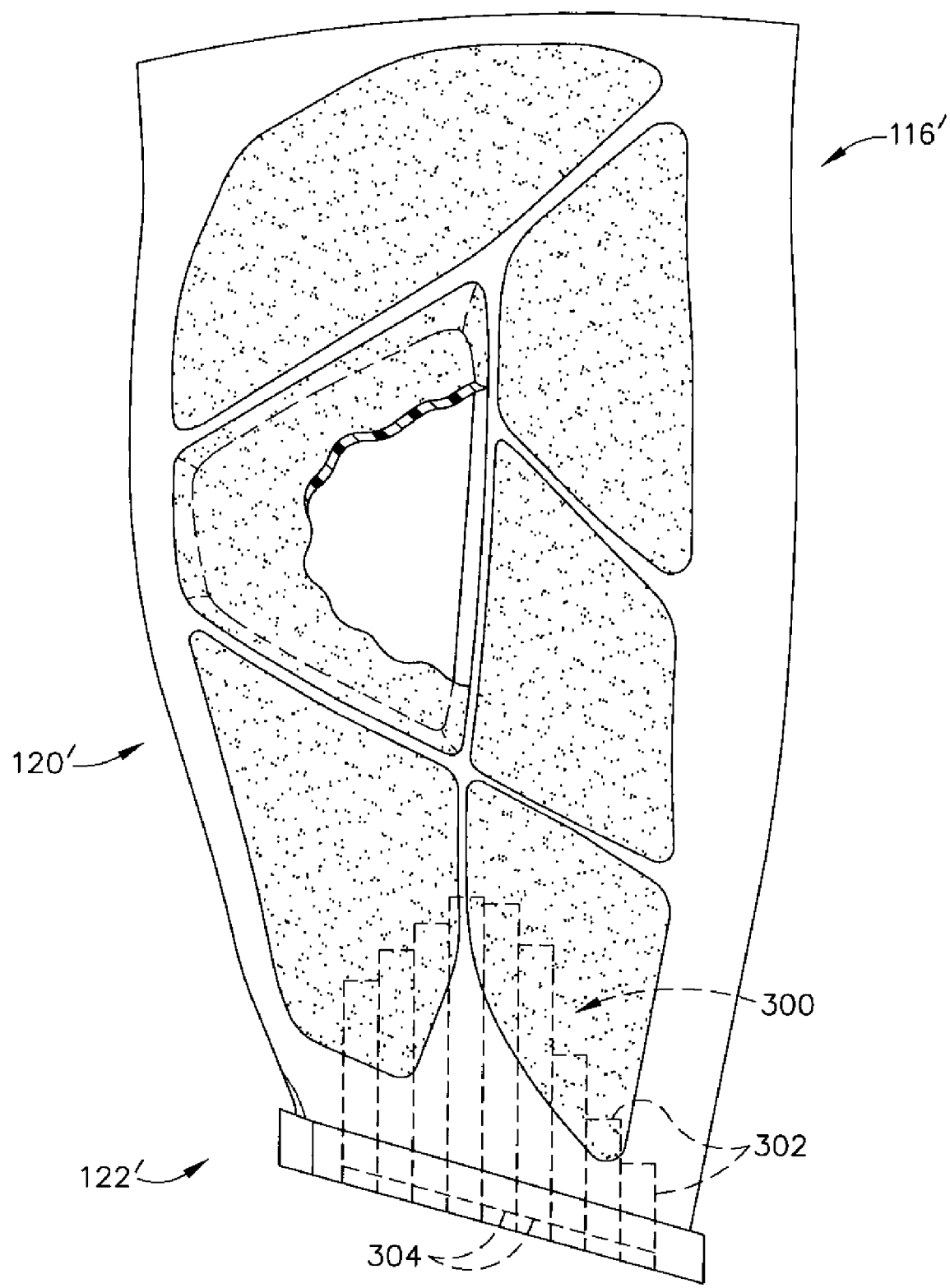
FIG. 8 is a side view of yet another alternative fan blade for use with the blisk of FIG. 1.

If the blades are made separately and attached to the hub they may be lightened by selectively removing material therefrom. For example, FIG. 8 illustrates an alternative blade 116' which is similar to blade 116 and has a shank portion 122' and an airfoil portion 120'. A hollow cavity 300 is formed in the shank portion 122' and extends upward partially into the airfoil portion. In the illustrated example, the cavity 300 is collectively formed by a group of gun-drilled holes 302, but other machining methods could be used. The presence of the cavity 300 helps remove material from the center of the shank portion 122' of the blade 116' that adds weight to the blade but does not contribute significantly to the blade's torsional stiffness or bending resistance. If necessary, the cavity 300 may be plugged at the bottom with welded or brazed plugs 304 prior to a translational friction welding process, in order to prevent the extrusion of material into the machined cavity during translational friction welding.

The completed blisk 10 offers several advantages. The main purpose of the insert 36 is to replace metal on the airfoil portion and hence reduce the weight of the blisk 10. This weight advantage is obtained without the weight or complexity of conventional dovetail blade mounting. This configuration can also improve the repairability of the blisk 10 by allowing only replacement of the inserts 36 in case of damage, instead of repairing the undamaged metal portion of the blisk 10 or replacing the blisk 10 entirely.

The foregoing has described a hybrid blisk, and a process for making such an blisk. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. An integral rotor assembly for a gas turbine engine, comprising:
   a metallic hub having an annular flowpath surface; and
   at least one blade extending outwardly from said flowpath surface, said blade comprising:
      a metallic body having a first density, said body being integral with said hub and defining a shank portion and an airfoil portion having opposed pressure and suction sides;
      a non-metallic insert having a second density less than said first density, said insert carried by a pocket formed in the airfoil portion of said body, wherein said insert and said body collectively define an airfoil shape having a leading edge and an opposed trailing edge;
      a non-metallic outer skin disposed about the airfoil portion of said body; and
      an erosion coating disposed about at least a portion of said outer skin, said erosion coating having a metallic portion adjacent the leading edge and a non-metallic portion extending along the pressure side and the suction side from the metallic portion to the trailing edge; and
      at least one cavity formed within the shank portion of said body and extending towards the airfoil portion.

2. The rotor assembly of claim 1 wherein said body and said hub are formed from a single continuous blank of material.

3. The rotor assembly of claim 1 wherein said body is formed separately from said hub and then joined to said hub.

4. The rotor assembly of claim 1 wherein the at least one pocket formed in the airfoil portion of said body is formed in at least one of said pressure and suction sides, and said insert is disposed in said pocket.

5. The rotor assembly of claim 4 wherein a plurality of pockets are formed in a selected one of said pressure and suction sides, said pockets being separated by upstanding ribs.

6. The rotor assembly of claim 1 wherein said airfoil portion has at least one pocket formed in both of said pressure and suction sides, and an insert is disposed in each of said pockets.

7. The rotor assembly of claim 6 wherein a plurality of pockets are formed in each of said pressure and suction sides, said pockets being separated by upstanding ribs.

8. The rotor assembly of claim 1 wherein said insert comprises a fiber-epoxy composite.

9. The rotor assembly of claim 1 wherein said insert comprises an elastomer.

10. A method of making an integral rotor assembly for a gas turbine engine, comprising:
    forming a metallic hub having an annular flowpath surface; and
    forming at least one blade integral to said hub and extending outwardly from said flowpath surface, said blade comprising:
       a metallic body having a first density, said body being integral with said hub and defining a shank portion and an airfoil portion having opposed pressure and suction sides;
       a non-metallic insert having a second density less than said first density, said insert carried by a pocket formed in the airfoil portion of said body, wherein said insert and said body collectively define an airfoil shape having a leading edge and an opposed trailing edge;
       a non-metallic outer skin disposed about the airfoil portion of said body; and
       an erosion coating disposed about at least a portion of said outer skin, said erosion coating having a metallic portion adjacent the leading edge and a non-metallic portion extending along the pressure side and the suction side from the metallic portion to the trailing edge; and
       at least one cavity formed within the shank portion of said body and extending towards the airfoil portion.

11. The method of claim 10 further comprising:
    forming said body and said hub from a single continuous blank of material; and attaching said insert to said body.

12. The method of claim 10 further comprising:
    forming said body separately from said hub;
    attaching said insert to said body to form said blade; and
    bonding said blade to said hub.

13. The method of claim 12 wherein said blade is bonded to said hub by a solid state joining process.

14. The method of claim 12 wherein said blade is bonded to said hub by translational friction welding.

15. The method of claim 14 further comprising:
    providing the shank portion of said body with excess material adapted to be clamped by a linear friction welding apparatus; and
    removing the excess material from the shank portion.

16. The method of claim 10 wherein said insert is separately formed and then attached to said body.

17. The method of claim 10 wherein said insert is cured in place on said body.

* * * * *